United States Patent [19]

Gallusser et al.

[11] 4,303,221

[45] Dec. 1, 1981

[54] CORE PIN FOR MAKING A PLASTIC CONNECTOR SHELL HAVING AN INTERNAL KEYWAY

[75] Inventors: David O. Gallusser, Oneonta; Valentine J. Hemmer, Sidney; Gary C. Toombs, Oneonta; Robert W. Brush, Unadilla, all of N.Y.

[73] Assignee: The Bendix Corporation, Southfield, Mich.

[21] Appl. No.: 206,768

[22] Filed: Nov. 14, 1980

[51] Int. Cl.³ .......................... B29C 1/00; B29F 1/06
[52] U.S. Cl. ..................... 249/102; 249/142; 249/175; 249/177; 249/184; 425/190; 425/192 R; 425/182; 425/183; 425/186; 425/577
[58] Field of Search ............... 249/102, 142, 175, 177, 249/184, 185, 186, 59; 425/182, 183, 186, 190, 192, 577

[56] References Cited

U.S. PATENT DOCUMENTS

| | | | |
|---|---|---|---|
| 76,672 | 4/1868 | Sutherland | 249/185 |
| 820,160 | 5/1906 | Wiest | 249/184 X |
| 1,720,503 | 7/1929 | Wickey | 249/184 X |
| 2,486,870 | 11/1949 | Nolan | 249/184 |
| 2,529,637 | 11/1950 | Sonnett et al. | 249/186 |
| 2,637,071 | 5/1953 | Williams et al. | 249/184 X |
| 2,728,126 | 12/1955 | Whitlock | 249/177 X |
| 2,744,288 | 5/1956 | Frenberg et al. | 249/59 |
| 3,061,880 | 11/1962 | Weisbach | 249/177 X |
| 3,216,072 | 11/1965 | Bauer | 249/184 X |
| 3,387,323 | 6/1968 | Wyllie et al. | 425/577 |
| 3,474,999 | 10/1969 | Shupe | 249/184 |
| 3,481,000 | 12/1969 | Barfuss | 249/59 X |
| 3,550,209 | 12/1970 | Carpenter | 425/577 X |
| 3,749,543 | 7/1973 | Stansbury | 249/184 X |
| 3,756,553 | 9/1973 | Rang | 249/184 X |
| 3,759,652 | 9/1973 | Childs | 249/59 X |
| 3,843,088 | 10/1974 | McLoughlin et al. | 249/184 X |
| 3,932,085 | 1/1976 | Horback | 425/186 |
| 4,025,269 | 5/1977 | Reinders | 425/577 X |

*Primary Examiner*—J. Howard Flint, Jr.
*Attorney, Agent, or Firm*—Raymond J. Eifler

[57] ABSTRACT

This invention provides a single core pin for use with a mold that may be rearranged to provide a plurality of molded configurations. The core pin is characterized by a plurality of arcuate segments 11 arranged to make up a cylindrical core pin 10. On at least one of the arcuate segments 11 there is along the outer surface thereof at least one radial projection 12 extending a predetermined axial distance along the surface.

9 Claims, 9 Drawing Figures

CORE PIN FOR MAKING A PLASTIC CONNECTOR SHELL HAVING AN INTERNAL KEYWAY

This invention relates to molds and mold core pins for making plastic connector shells.

In recent years molded plastic articles have replaced many articles made of machined metal, thus resulting in a substantial decrease in the cost and weight of the article. For many purposes the plastic article serves the purpose as well as the same articles made of metal. However, the molding operation, while being responsible for decreased cost of the article has had certain limitations on designs and features which prevent the products from being made of plastic. For example, most electrical connectors include a key and a keyway for aligning the electrical contacts to be mated within the connector shells. Some electrical connectors have as many as ten alternate positions of these keys and keyways and, accordingly, there would have to be a mold for every alternate position thereby increasing the overall cost of molding a plastic connector. Examples of molds and core pins for molds may be found in U.S. Pat. Nos. 3,387,323 issued June 11, 1968 and entitled "Mold With Core Having Thread Forming Portions"; 3,550,209 issued Dec. 29, 1970 and entitled "Apparatus for Molding Articles"; and 4,025,269 issued May 24, 1977 and entitled "Mold Structure and Cavity Forming Insert Arrangement Therefore". None of these foregoing patents illustrate a core comprised of several arcuate segments which can be rearranged to achieve different molded configurations of a plastic connector shell.

DISCLOSURE OF THE INVENTION

The invention provides a core pin for a mold that may be rearranged to provide a plurality of molded configurations. The invention is a core pin for a mold characterized by the fact that the cylindrical core pin is comprised of a plurality of arcuate segments that make up the cylindrical core pin and that, on at least one of the arcuate segments, there is along the outer surface thereof at least one radial projection extending a predetermined axial distance along the surface.

One advantage of the invention is that a single adjustable core pin can be used to make more than one molded configuration.

Another advantage of the invention is that the novel core pin eliminates the need for having several molds for several alternate arrangements of a key or keyway within a connector shell.

DETAILED DESCRIPTION OF THE INVENTION

Figure 1:
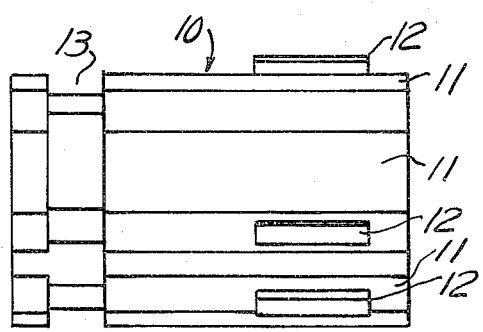
FIG. 1 illustrates a core pin incorporating the principles of the invention.

Referring now to the drawings, FIG. 1 illustrates a core pin 10 for a mold. The core pin 10 is comprised of a plurality of arcuate segments 11 arranged to form a cylindrical body. Each of the segments 11 includes a recessed portion 13 so that when the arcuate segments are arranged to form the cylindrical body the recessed portions form an annular recess 13 around one end portion of the cylindrical body. On the outer surface of some of the arcuate segments there is a projection 12 that extends a predetermined axial distance.

Figure 2:
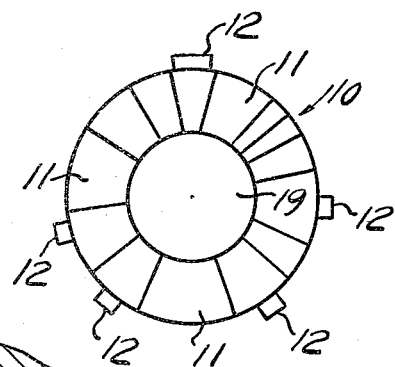
FIG. 2 is an end view of the core pin shown in FIG. 1.

FIG. 2 shows how each of the arcuate segments 11 are arranged to form the core pin 10. The arrangement of the segments 11 results in a center cavity 19. Although five radial projections 12 are shown extending from the arcuate segments more or less projections could be present.

Figure 3:
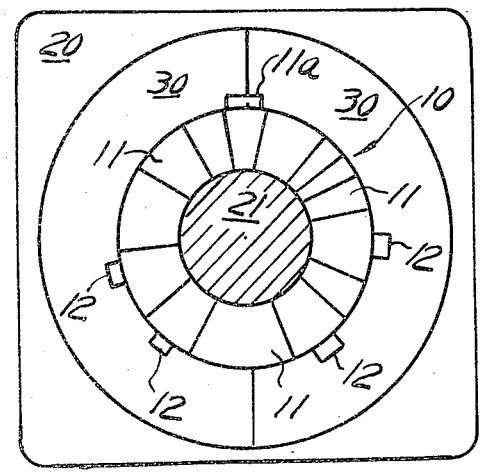
FIG. 3 illustrates the core pin shown in FIGS. 1 and 2 mounted to a base portion.

FIG. 3 illustrates the core pin mounted on a base assembly. The assembly comprises a main plate 20 which has a pin shaped projection 21 extending therefrom. The arcuate segments are arranged around the pin 21 to form a solid cylindrical body and held in place by two plates 30 which together form a circle that locks into the annular groove (FIG. 1, item 13) to lock the arcuate segments 11 in a fixed position to the base 20.

Figure 4:
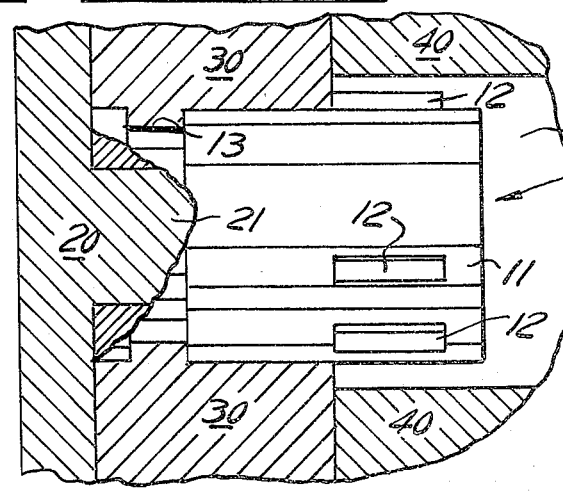
FIG. 4 illustrates the assembly shown in FIG. 3 mounted to the other half of a mold.

FIG. 4 is a partial cutaway view of the mold pin and the base assembly mounted to the remaining portion of the mold 40. The cutaway view illustrates how the pin portion 21 of the base member extends into the cavity in the mold pin and how the remaining base members 30 extend into the groove 13 in the core pin to retain the arcuate segments in a fixed relationship. The void 41 in the mold is filled with a liquid plastic and allowed to harden. When the core pin 10 and the base assembly is removed from the mold portion 40 the remaining molded piece will include keyways i.e. axial grooves formed by the projections 12.

Figure 5:
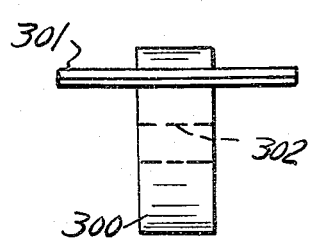

Referring now to FIGS. 5 through 9 an alternate embodiment of the core pin is illustrated. In this embodiment different configurations of keyways within a connector shell can be obtained from the core pin by rotating portions of the core pin. FIG. 5 illustrates one circular segment 300 of the core pin which includes an axially extending member 301 tangent to its surface.

Figure 6:
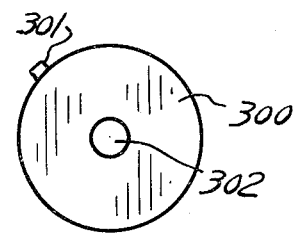

FIG. 6 illustrates an end view of the circular core pin segment shown in FIG. 5 and illustrates that there is a central aperture 302 that extends through the segment 300.

Figure 7:
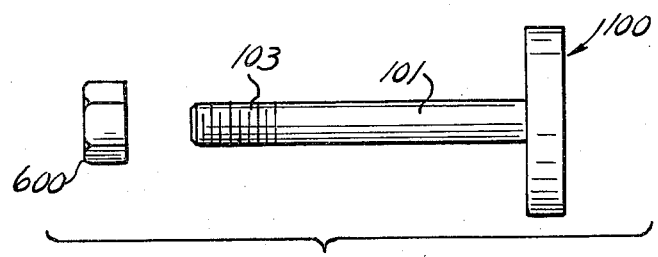

FIG. 7 illustrates a member 100 which has a spindle 101 for receiving a plurality of the core pin members shown in FIGS. 5 and 6. A fastening means such as nut 600 is connectable to the threads 103 on the spindle 101.

Figure 8:
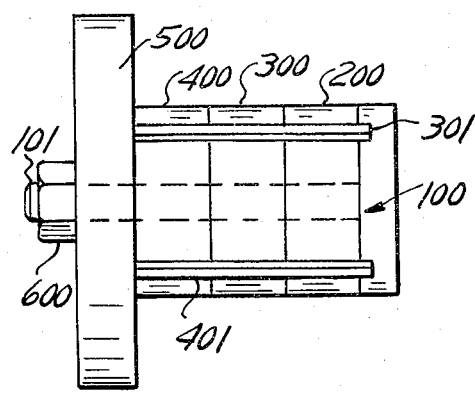
FIGS. 5 through 9 illustrate an alternate embodiment of the invention.

FIG. 8 illustrates a core pin assembly which comprises a plurality of circular core pin segments 200, 300 and 400 mounted on the member 100. Axially extending member 301 is attached to circular member 300 and axial member 401 is attached to circular member 400. By rotating circular member 300 relative to circular member 400 the distance between the axially extending members 301 and 401 changes thereby changing the relationship of the keyways in a molded part.

Figure 9:
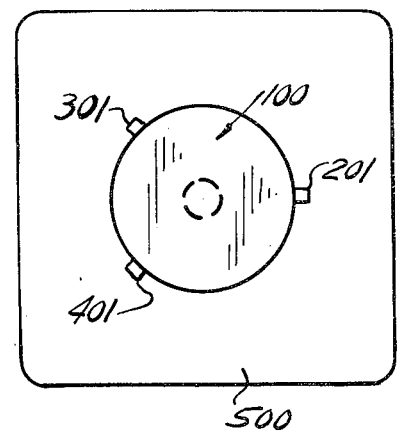

FIG. 9 illustrates an end view of the core pin assembly shown in FIG. 8 and illustrates that there may also be an axial projection 201 on circular member 200. By rotating any of the circular members 200, 300 or 400 the space relationship between the axially extending members changes hence changing the configuration of the molded keyways in the connector shell. An enlarged base portion 500 of the assembly is adapted to mate with the opening of a mold (now shown) to completely enclose the mold cavity except for an entry port for injecting liquid plastic.

While a preferred embodiment of the invention has been disclosed, it will be apparent to those skilled in the art, that changes may be made to the invention as set forth in the appended claims, and in some instances, certain features of the invention may be used to advantage without corresponding use of other features. For example, each of the projections 12 could be replaced by axial recesses so that the core pin would mold keys into a connector housing instead of keyways. Accordingly, it is intended that the illustrative and descriptive materials herein be used to illustrate the principles of the invention and not to limit the scope thereof.

Having described the invention what is claimed is:

1. A core pin for use with a mold for making a plastic connector shell having at least two keyways, said core pin comprising:
   a plurality of arcuate segments arranged to form a cylindrical body; and
   a radical projection along the outer surface of at least two of said segments whereby each rearrangement of said segments having said projection results in a different outer configuration of said cylindrical body, said radial projection extending an axial distance along said surface.

2. The core pin as recited in claim 1 wherein said plurality of arcuate segments arranged to form a cylindrical body comprises:
   a base member having a pin shaped extension extending therefrom;
   said plurality of arcuate segments disposed around said pin portion to form said cylindrical body, each of said arcuate segments including an annular recess therein, each of said recesses aligned to form an annular groove around one end of said segments opposite from that end of the cylindrical body having said radial projections; and
   means for retaining said plurality of arcuate segments in a fixed position around said mounting pin.

3. A core pin for use with a mold for making a plastic connector shell having at least two keyways, said core pin comprising:
   a plurality of annular segments arranged to form a cylindrical body; and
   a radial projection along the outer surface of at least two of said segments, said radial projection extending an axial distance being said surface.

4. The core pin as recited in claim 3 wherein said plurality of circular segments arranged to form a cylindrical body comprises:
   a base member having a pin shaped projection thereon, each of said circular segments being mounted on said pin shaped portion of said base member to retain said circular segments in a fixed axial position with relationship to each other while allowing rotation of each of the circular segments.

5. A mold for producing articles having internal keyways, comprising:
   a first mold section having a cavity for forming articles;
   a second mold section mounted to the first mold section, said mold sections being movable relative to one another, said second mold section comprising:
      a core member for said cavity, said core member comprised of a plurality of arcuate segments and means for mounting said arcuate segments to form a cylindrical body; and
      a radial projection along the outer surface of at least two of said segments whereby each rearrangement of said segments having said projection results in a different outer configuration of said cylindrical body, said radial projection extending an axial distance along said surface.

6. A core pin for use with a mold for making a plastic connector shell having at least two keys, said core pin comprising:
   a plurality of arcuate segments arranged to form a cylindrical body; and
   a recess in the outer surface of at least two of said segments whereby each rearrangement of said segments having said recess results in a different outer configuration of said cylindrical body, said recess extending an axial distance along said surface.

7. The core pin as recited in claim 6 wherein there are at least 2 arcuate segments each having a recess whereby each rearrangement of said segments having said recess results in a different outer configuration of said tubular body.

8. A core pin for use with a mold for making a plastic connector shell having at least two keys, said core pin comprising:
   a plurality of annular segments arranged to form a cylindrical body; and
   a recess in the outer surface of at least two of said segments whereby each rearrangement of said segments having said recess results in a different outer configuration of said cylindrical body, said recess extending an axial distance along said surface.

9. The core pin as recited in claim 8 wherein said plurality of circular segments arranged to form a cylindrical body comprises:
   a base member having a pin shaped projection thereon, each of said circular segments being mounted on said pin shaped portion of said base member to retain said circular segments in a fixed axial position with relationship to each other while allowing rotation of each of the circular segments.

* * * * *

UNITED STATES PATENT AND TRADEMARK OFFICE
CERTIFICATE OF CORRECTION

PATENT NO. : 4,303,221

DATED : December 1, 1981

INVENTOR(S) : David O. Gallusser, Valentine J. Hemmer, Gary C. Toombs, Robert W. Brush It is certified that error appears in the above—identified patent and that said Letters Patent are hereby corrected as shown below:

Column 3, line 19, change "radical" to --radial--.

Signed and Sealed this

Ninth Day of February 1982

[SEAL]

Attest:

*Attesting Officer*

GERALD J. MOSSINGHOFF

*Commissioner of Patents and Trademarks*